UNITED STATES PATENT OFFICE.

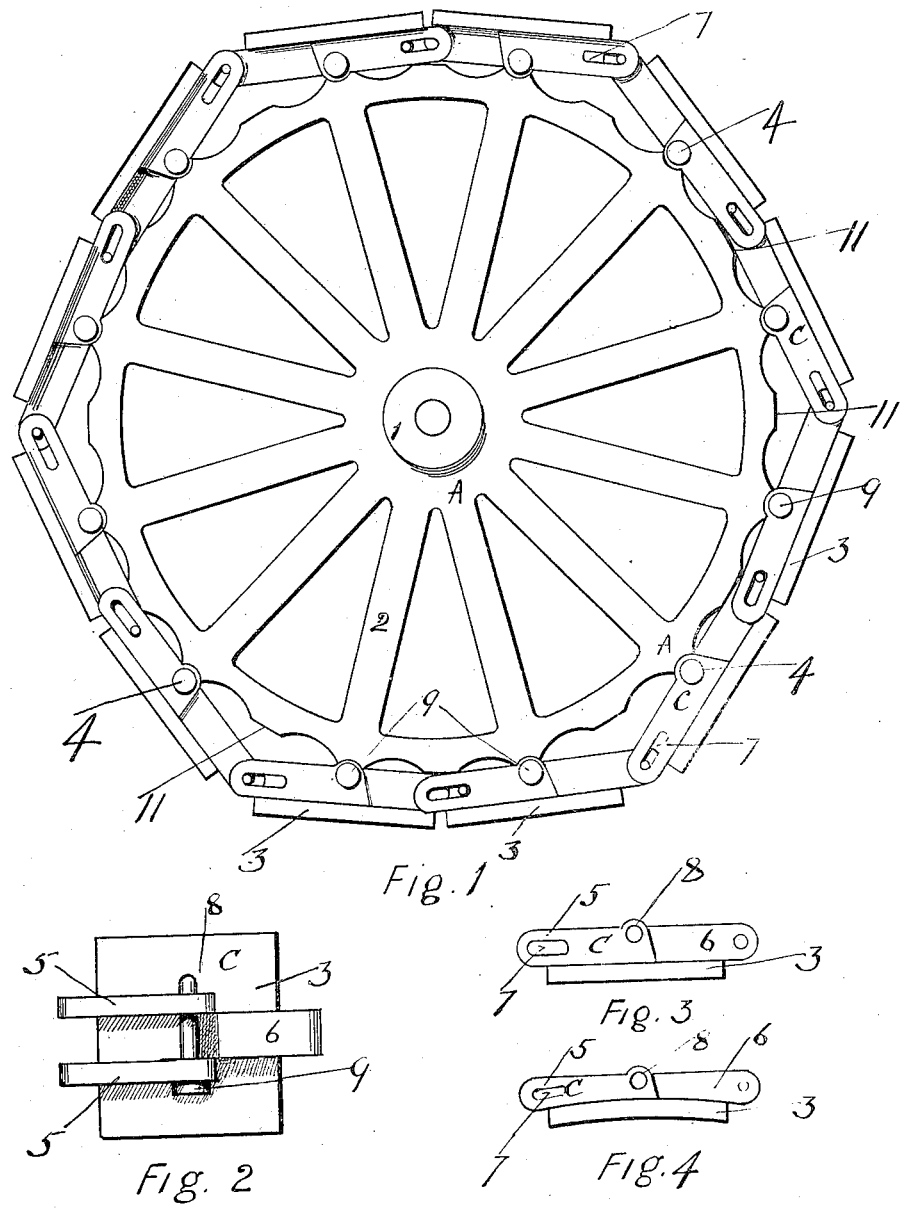

JAMES PORTEOUS, OF FRESNO, CALIFORNIA.

TRACTION-WHEEL.

1,106,842.

Specification of Letters Patent. Patented Aug. 11, 1914.

Application filed March 17, 1914. Serial No. 825,234.

*To all whom it may concern:*

Be it known that I, JAMES PORTEOUS, a citizen of the United States, and a resident of the city of Fresno, county of Fresno, and State of California, have invented a new and useful Improvement in Traction-Wheels, of which the following is a specification.

My invention relates to an improvement in traction wheels, and its object is to keep the wheels having such improvement thereon from slipping, and from sinking in soft ground. Such improvement consists of plates or shoes attached to the periphery of the wheel in such manner that the wheel will rest on one or more of said plates at all times during its revolution. Said plates are constructed in such relationship with the adjoining plates that when any plate is resting on the ground, the movement of the wheel in either direction will bring the next adjoining plate to the ground in line with the one upon which the wheel rests, and as such wheel revolves the plates are carried on the periphery thereof thus forming a continuous track upon which such wheel can travel.

In the drawings which accompany this specification, Figure 1 is a side view of the wheel complete. Fig. 2 is a top view of the shoe, or plate removed from the wheel. Fig. 3 is a side view of Fig. 2. Fig. 4 shows a modified form of shoe.

In said drawings A is a wheel which can be constructed with an ordinary hub 1 and spokes 2 and having a rim which is preferably constructed with a plurality of transverse pivotal bearings, 4, equi-distant apart, and an equal number of bumpers 11 between such pivotal bearings. In my construction I prefer to have such bearings opposite to, or at the end of each spoke. At the pivotal bearings I have increased the thickness of the rim to make such bearings more rigid. It is herein noted that while the construction above set forth is my preference, the same object can be accomplished by eliminating the rim of the wheel and constructing the pivotal bearings and bumpers on the ends of alternate spokes, and strengthening the wheel by bracing such spokes together, or an ordinary disk may be used in lieu of a wheel with spokes.

C is a plate or shoe hereinafter described. It is constructed with a base the approximate length of the distance between contiguous bumpers and of any width desired. One of such plates is pivoted to the periphery of the wheel at each of such pivotal bearings to permit of a rocking motion which is limited by the bumpers on either side of such pivotal bearing. 8 is the pivoted bearing on plate C and 9 is the pin passing through such bearings. On the top of said plate I have formed longitudinal projections 5 at the one end and longitudinal projection 6 at the other end. Projection 6 will work between the projections 5. In my construction I have constructed projections 5 and 6 so they will engage bumper 11. Projection 6 can be substituted by a pair of projections adapted to slide between projection 5 on the adjoining shoe and to allow bumper 11 to pass between them. In such construction bumper 11 would knock on the top of base 3. 7 is a slot in projection 5, the object being to slidingly pivot projection 5 on one shoe to projection 6 on the adjoining shoe. These shoes should be pivoted in such relation that the ends of connected shoes can rest on their common bumper without friction. The slot 7 can be made in either projections 5 or 6. This same construction can be applied to drums by using two disks or wheels and connecting them with plates as described.

What I claim as my invention and upon what I desire Letters Patent is:

1. In a wheel, the combination of a plurality of bumpers equidistant apart on the periphery thereof, a plurality of plates equal to the number of such bumpers rockingly pivoted at the approximate lateral center thereof to the rim of the wheel, midway between contiguous bumpers, and arranged so the adjoining ends of contiguous bumpers can rest on a common bumper, slotted extensions on the upper side of such plates at one end thereof, slidingly pivoted to the adjoining shoe and adapted to actuate the plate adjoining the plate upon which the wheel rests, and in the direction in which such wheel is moving, to a common plane as such wheel rotates.

2. In a wheel the combination of a plurality of bumpers 11 on the periphery thereof equi-distant apart, a plurality of plates corresponding with the number of bumpers, each plate constructed with a base 3, the approximate length of the periphery of the wheel between the centers of two contiguous bumpers, on the top of said base two parallel projections with lateral slots 7 on the sides and a rear extension 6 which is slidably pivoted to the next adjoining plate, an upward extension 8 carrying pivotal bearings through which said bearings the plate is pivoted to the rim of the wheel midway between said bumpers, all substantially as described.

3. In a wheel, the combination of a plurality of bumpers equidistant apart on the periphery thereof, plates with slotted extensions on the upper side slidingly pivoted to the adjoining plates, and adapted to draw the adjacent end of the adjoining plate to a common bumper as the wheel rolls over such connected plates, whether such wheel is rotating forward or backward, all substantially as described.

JAMES PORTEOUS.

Witnesses:
 ANITA GIL,
 A. M. DREW.